United States Patent
Sakakibara et al.

(10) Patent No.: US 11,137,767 B2
(45) Date of Patent: Oct. 5, 2021

(54) AUTONOMOUS TRAVEL DEVICE AND AUTONOMOUS TRAVEL SYSTEM

(71) Applicant: SHARP KABUSHIKI KAISHA, Sakai (JP)

(72) Inventors: Masahiro Sakakibara, Sakai (JP); Nobutoshi Tsujimoto, Sakai (JP); Takahiro Ueno, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 295 days.

(21) Appl. No.: 16/327,148

(22) PCT Filed: Aug. 24, 2017

(86) PCT No.: PCT/JP2017/030318
§ 371 (c)(1),
(2) Date: Feb. 21, 2019

(87) PCT Pub. No.: WO2018/038207
PCT Pub. Date: Mar. 1, 2018

(65) Prior Publication Data
US 2021/0141388 A1     May 13, 2021

(30) Foreign Application Priority Data
Aug. 26, 2016    (JP) .............................. JP2016-165372

(51) Int. Cl.
*G05D 1/02*        (2020.01)
*G05D 1/00*        (2006.01)

(52) U.S. Cl.
CPC ......... *G05D 1/0263* (2013.01); *G05D 1/0088* (2013.01); *G05D 1/0212* (2013.01)

(58) Field of Classification Search
CPC ... G05D 1/0263; G05D 1/0088; G05D 1/0212
See application file for complete search history.

(56) References Cited

U.S. PATENT DOCUMENTS 4,866,617 A   *   9/1989   Matsuda ............... G05D 1/0246
                                                          701/25
5,925,080 A   *   7/1999   Shimbara ............. G05D 1/0244
                                                          701/23
(Continued)

FOREIGN PATENT DOCUMENTS

JP           08044427 A   *   2/1996
JP      2000-010632 A      1/2000
(Continued)

OTHER PUBLICATIONS

Patent Translate, "Translation of Description of JPH0844427A", 2021, European Patent Office (Year: 2021).*
(Continued)

*Primary Examiner* — Yazan A Soofi
*Assistant Examiner* — Naeem Taslim Alam
(74) *Attorney, Agent, or Firm* — ScienBiziP, P.C.

(57) ABSTRACT

There is provided a technique capable of easily realizing control to cause an autonomous travel device to perform a predetermined operation at a predetermined position on a travel route.
An autonomous travel device (2) is an autonomous travel device that travels along a line (1) placed on a travel route, and includes a detecting unit (line sensor (21)) that detects the line (1), and a control unit that controls an operation of the autonomous travel device (2) on the basis of a detection result from the detecting unit. The control unit determines a width (W) of the line (1) on the basis of the detection result from the detecting unit. If the determined width (W) of the line (1) is smaller than a predetermined reference width, the control unit causes the autonomous travel device (2) to perform a travel operation of traveling along the line (1). On the other hand, if the determined width (W) of the line (1) is larger than or equal to the predetermined reference width,
(Continued)

the control unit causes the autonomous travel device (2) to perform a predetermined operation different from the travel operation.

8 Claims, 13 Drawing Sheets

(56) References Cited

U.S. PATENT DOCUMENTS

| | | | | |
|---|---|---|---|---|
| 6,577,334 | B1* | 6/2003 | Kawai | B60G 17/0165 |
| | | | | 348/148 |
| 2006/0064212 | A1* | 3/2006 | Thorne | G05D 1/0246 |
| | | | | 701/23 |
| 2011/0153135 | A1* | 6/2011 | Kondo | G05D 1/0261 |
| | | | | 701/23 |
| 2015/0336510 | A1* | 11/2015 | Imai | G06T 7/73 |
| | | | | 348/148 |
| 2019/0079537 | A1* | 3/2019 | Yoshida | G05D 1/0274 |

FOREIGN PATENT DOCUMENTS

| | | | |
|---|---|---|---|
| JP | 2001-005525 | A | 1/2001 |
| JP | 2003-216239 | A | 7/2003 |
| JP | 2013-238907 | A | 11/2013 |

OTHER PUBLICATIONS

Lee, "The Design of Magnetic Guided AGV", Chinese Master's Theses Full-text Database Information Science and Technology, Nov. 15, 2013, pp. I140-128, vol. 11.

\* cited by examiner

FIG. 2
(A)
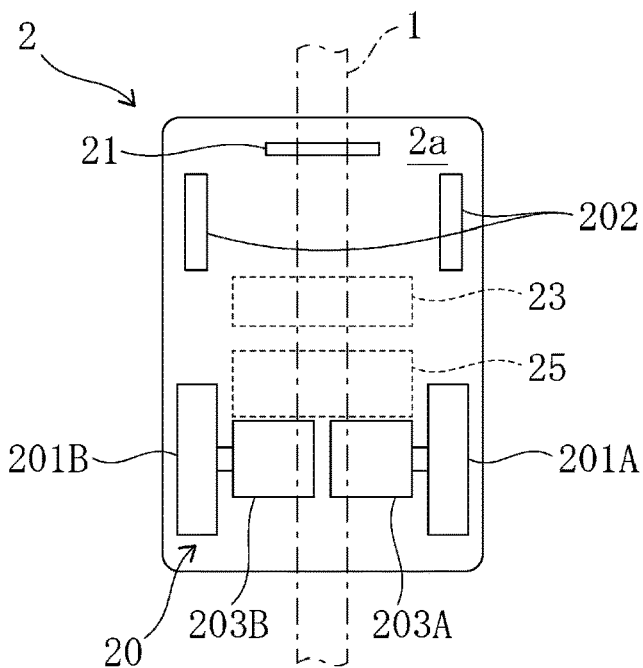
(B)
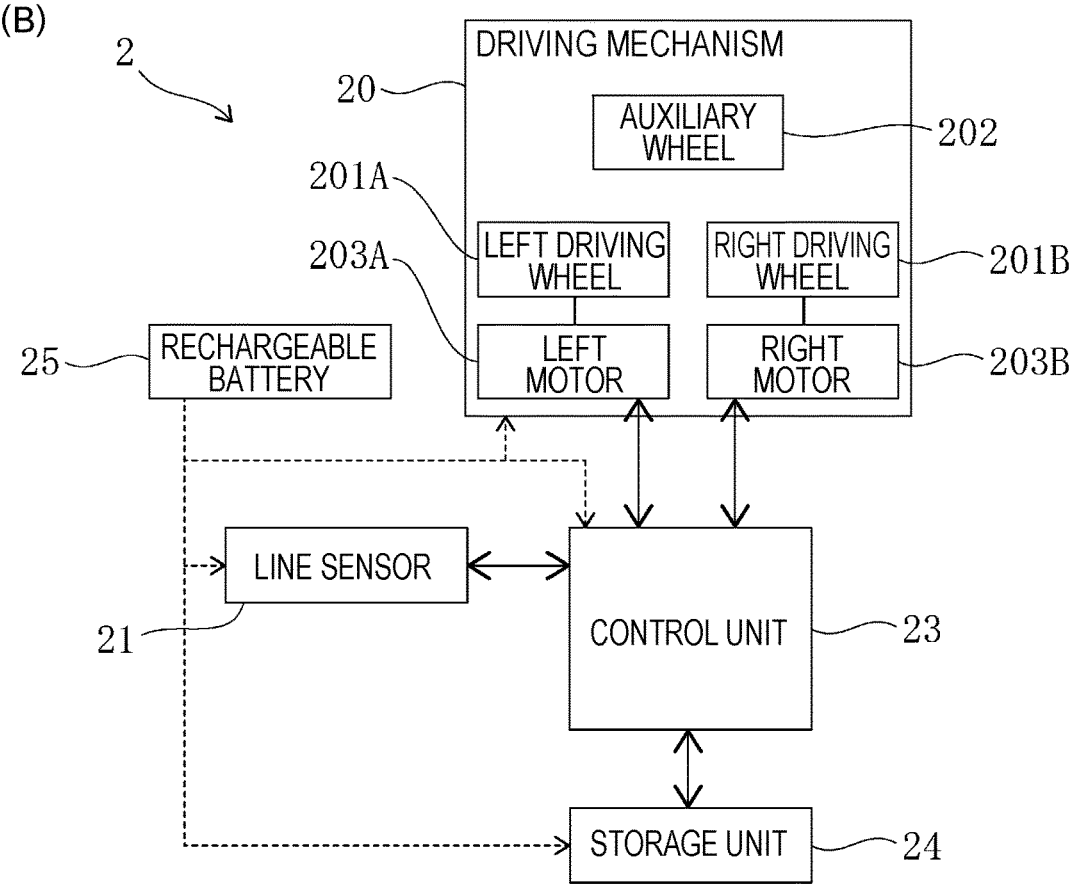

AUTONOMOUS TRAVEL DEVICE AND AUTONOMOUS TRAVEL SYSTEM

TECHNICAL FIELD

One embodiment of the present invention relates to a technique for causing an autonomous travel device to travel along a line serving as a guide for traveling.

BACKGROUND ART

In an existing autonomous travel system, a magnetic tape serving as a guide for traveling is attached on a route along which an autonomous travel device travels, and the autonomous travel device moves along the magnetic tape while detecting the magnetic tape. In such an autonomous travel system, there is a demand for the autonomous travel device to perform a predetermined operation, such as stopping or turning, at a predetermined position while moving along the magnetic tape.

To satisfy the foregoing demand, control has been commonly performed in which a marker is placed at a predetermined position on a travel route and an autonomous travel device is caused to determine the predetermined position on the travel route by detecting the marker by using a dedicated sensor and to perform a predetermined operation at the predetermined position that has been determined (see, for example, PTL 1).

PTL 2 discloses another control technique. Specifically, a magnetic tape alternately magnetized to the N pole and the S pole is used as a magnetic tape serving as a guide for traveling, and an autonomous travel device is caused to alternately detect the N pole and the S pole of the magnetic tape by using a magnetic sensor capable of detecting magnetic poles and to perform a predetermined operation in accordance with a detection result.

CITATION LIST

Patent Literature

PTL 1: Japanese Unexamined Patent Application Publication No. 2000-10632
PTL 2: Japanese Unexamined Patent Application Publication No. 2001-5525

SUMMARY OF INVENTION

Technical Problem

However, in the control to detect a marker by using a dedicated sensor as in PTL 1, it is necessary to place a marker on a travel route as well as a magnetic tape, and also it is necessary to provide an autonomous travel device with the dedicated sensor for detecting the marker. This causes an issue that the autonomous travel device is complicated.

In the control to detect magnetic poles of a magnetic tape by using a magnetic sensor as in PTL 2, it is necessary to use a special magnetic tape alternately magnetized to the N pole and the S pole as a magnetic tape serving as a guide for traveling, and also it is necessary to provide an autonomous travel device with a magnetic sensor capable of distinguishing and detecting the N pole and the S pole. This causes an issue that the tape and sensor to be used are significantly restricted due to the system configuration.

Accordingly, an object of one embodiment of the present invention is to provide a technique capable of easily realizing control to cause an autonomous travel device to perform a predetermined operation at a predetermined position on a travel route.

Solution to Problem

An autonomous travel device according to one embodiment of the presenter invention is an autonomous travel device that travels along a line placed on a travel route, and includes a detecting unit that detects the line, and a control unit that controls an operation of the autonomous travel device on the basis of a detection result from the detecting unit. The control unit determines a width of the line on the basis of the detection result from the detecting unit. If the determined width of the line is smaller than a predetermined reference width, the control unit causes the autonomous travel device to perform a travel operation of traveling along the line. On the other hand, if the determined width of the line is larger than or equal to the predetermined reference width, the control unit causes the autonomous travel device to perform a predetermined operation different from the travel operation.

Advantageous Effects of Invention

According to one embodiment of the present invention, it is possible to easily realize control to cause an autonomous travel device to perform a predetermined operation at a predetermined position on a travel route.

BRIEF DESCRIPTION OF DRAWINGS

FIG. 2(A) is a bottom view of an autonomous travel device included in the autonomous travel system, and FIG. 2(B) is a block diagram illustrating the configuration of the autonomous travel device.

DESCRIPTION OF EMBODIMENTS

Figure 1:
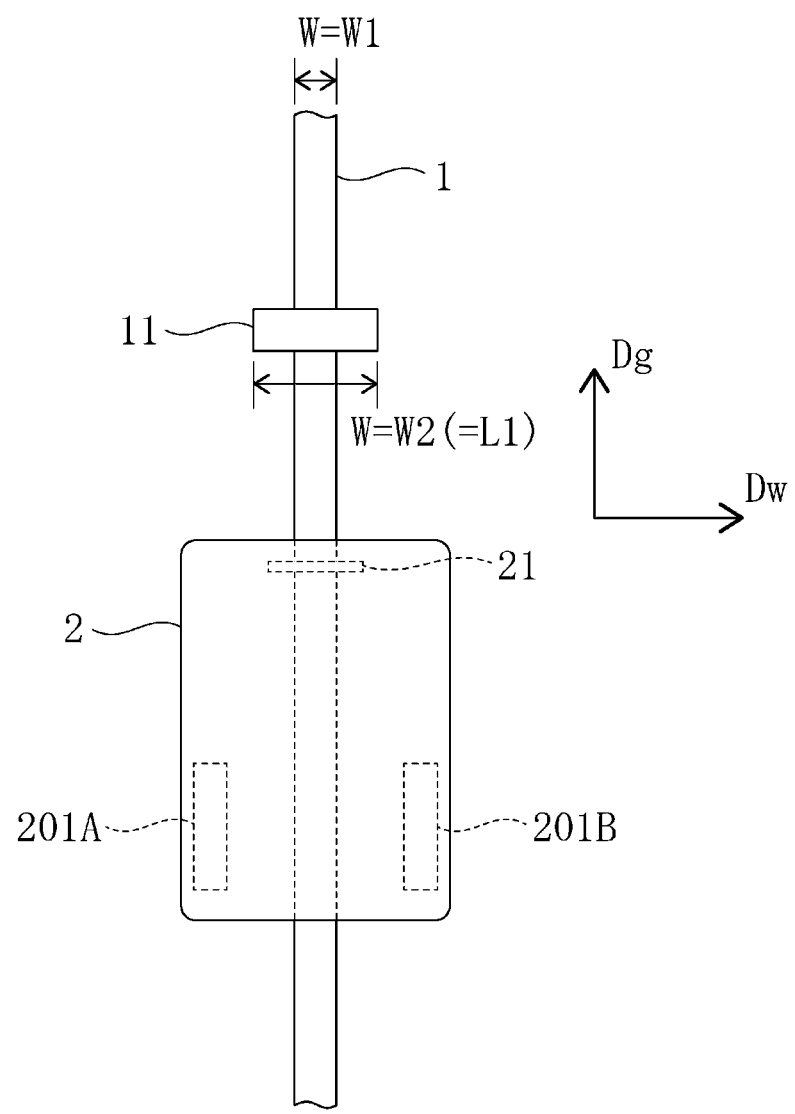
FIG. 1 is a conceptual diagram illustrating an autonomous travel system according to a first embodiment.

An autonomous travel device according to one embodiment of the present invention is an autonomous travel device that travels along a line placed on a travel route, and includes a detecting unit that detects the line, and a control unit that controls an operation of the autonomous travel device on the basis of a detection result from the detecting unit. The control unit determines a width of the line on the basis of the detection result from the detecting unit. If the determined width of the line is smaller than a predetermined reference width, the control unit causes the autonomous travel device to perform a travel operation of traveling along the line. On the other hand, if the determined width of the line is larger than or equal to the predetermined reference width, the control unit causes the autonomous travel device to perform a predetermined operation different from the travel operation.

According to the foregoing autonomous travel device, simple control of determining the width of the line enables a portion with a larger width to be accurately detected. Thus, providing the portion with a larger width at a position desired by a user makes it possible to cause the autonomous travel device to perform the predetermined operation at the exact desired position.

In the foregoing autonomous travel device, the detecting unit may preferably include a line sensor provided on a bottom surface of the autonomous travel device, and the control unit may preferably determine the width of the line on the basis of a detection result from the line sensor. As a more specific configuration, the control unit may preferably be capable of further determining a detection position of the line in the line sensor in addition to determining the width of the line on the basis of the detection result from the line sensor. The control unit may preferably further determine the detection position if the determined width of the line is smaller than the predetermined reference width, and may preferably control a travel position of the autonomous travel device in a width direction of the line on the basis of the determined detection position while causing the autonomous travel device to travel along the line. With this configuration, the width of the line can be detected by the line sensor that has been conventionally used to control a travel position. Accordingly, the configuration of the autonomous travel device is not complicated.

In the foregoing autonomous travel device, the predetermined reference width may preferably be an upper limit value of a line width detectable by the detecting unit. With this configuration, a normal width of the line and a width in the widened portion are easily distinguished from each other.

The foregoing autonomous travel device may preferably further include a detection sensor that detects a marker placed on the travel route. In this configuration, the control unit may preferably perform the following control. First, the control unit enters a preparatory state in response to detection of the marker by the detection sensor. Subsequently, the control unit causes the autonomous travel device to perform the predetermined operation if the width of the line determined when the control unit is in the preparatory state is larger than or equal to the predetermined reference width. On the other hand, when the control unit is not in the preparatory state, the control unit does not cause the autonomous travel device to perform the predetermined operation even if the determined width of the line is larger than or equal to the predetermined reference width.

With this configuration, by placing the marker at a position before a desired portion to be detected as a portion with a larger width, it becomes possible to accurately detect the desired portion by distinguishing it from a portion that may be wrongly detected, such as an intersection or a turn. As a result, a wrong operation is prevented from occurring where the autonomous travel device 2 performs a predetermined operation at a position other than a position desired by a user.

Alternatively, the control unit may perform the following control. First, the control unit enters a preparatory state in response to detection of the marker by the detection sensor. Subsequently, the control unit causes the autonomous travel device to perform the predetermined operation if the width of the line determined when the control unit is not in the preparatory state is larger than or equal to the predetermined reference width. On the other hand, when the control unit is in the preparatory state, the control unit does not cause the autonomous travel device to perform the predetermined operation even if the determined width of the line is larger than or equal to the predetermined reference width.

With this configuration, by placing the marker at a position before a portion that may be wrongly detected, such as in intersection or a turn, a wrong operation is prevented from occurring where the autonomous travel device performs a predetermined operation at the portion. Accordingly, it becomes possible to accurately detect a desired portion to be detected as a portion with a larger width, by distinguishing the desired portion from the portion such as an intersection or a turn. As a result, it becomes possible to cause the autonomous travel device to perform a predetermined operation at the exact position desired by a user.

In the foregoing autonomous travel device, the detection sensor may preferably detect a communication tag placed on the travel route as the marker. With this configuration, the detection sensor and the marker are capable of communicating with each other for a predetermined period over which the autonomous travel device passes over the marker and its vicinity. Accordingly, the marker can be accurately detected even while the autonomous travel device is traveling.

An autonomous travel system according to one embodiment of the present invention includes the foregoing autonomous travel device, and a line serving as a guide for traveling and placed on a travel route along which the autonomous travel device travels, the line partially having a widened portion with an increased width. In the autonomous travel system, the line may be formed of a magnetic tape attached on the travel route. In this case, a simple task of attaching another magnetic tape so as to cross the magnetic tape enables the widened portion to be formed.

Hereinafter, details of embodiments will be described.

[1] First Embodiment

FIG. 1 is a conceptual diagram illustrating an autonomous travel system according to a first embodiment. As illustrated in FIG. 1, the autonomous travel system includes a line 1 serving as a guide for traveling and an autonomous travel device 2 that travels along the line 1.

[1-1] Line

The line 1 is placed on a travel route along which the autonomous travel device 2 travels. In the present embodiment, the line 1 is formed of a magnetic tape attached on the travel route. Furthermore, the line 1 partially includes a widened portion 11 with an increased width W. The widened portion 11 can be formed by attaching another magnetic tape with a length L1 larger than a width W1 so as to cross the magnetic tape (width W1) attached along the travel route. In this case, the line 1 has, at the widened portion 11, a width W2 (=length L1) larger than the normal width W1.

[1-2] Autonomous Travel Device

FIG. 2(A) is a bottom view of the autonomous travel device 2, and FIG. 2(B) is a block diagram illustrating the configuration of the autonomous travel device 2. As illustrated in FIGS. 2(A) and (B), the autonomous travel device 2 includes a driving mechanism 20 that takes a role in an operation, such as traveling forward or turning, a line sensor 21 that detects the line 1, a control unit 23 that controls an operation of the autonomous travel device 2, a storage unit 24, and a rechargeable battery 25 that supplies power to each unit.

<Driving Mechanism>

The driving mechanism 20 includes a left driving wheel 201A, a right driving wheel 201B, auxiliary wheels 202 that support the autonomous travel device 2 together with these driving wheels, a left motor 203A that rotates the left driving wheel 201A, and a right motor 203B that rotates the right driving wheel 201B. The left motor 203A and the right motor 203B can be controlled independently of each other, whereas the rotation directions and rotation speeds of the individual motors are controlled by the control unit 23 in association with each other. The terms "left" and "right" are used on the basis of a traveling direction Dg of the autonomous travel device 2 in a plan view (FIG. 1) of the autonomous travel device 2.

<Line Sensor>

Figure 3:
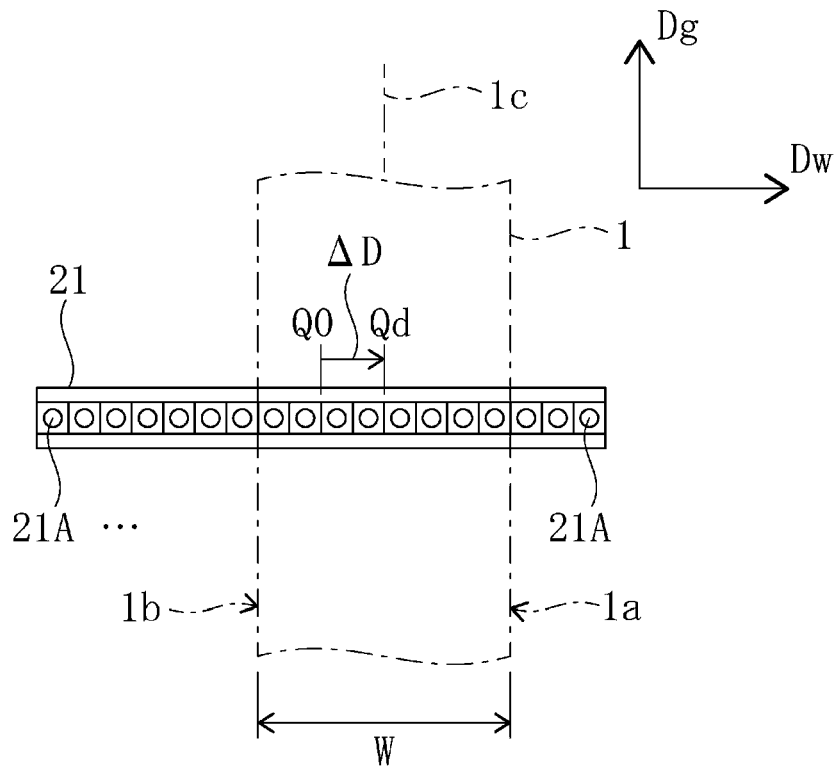
FIG. 3 is an enlarged view of a line sensor included in the autonomous travel device.

FIG. 3 is an enlarged view of the line sensor 21. The line sensor 21 is provided on a bottom surface 2a of the autonomous travel device 2 (see FIG. 2(A)). As illustrated in FIG. 3, the line sensor 21 is constituted by a plurality of detecting elements 21A aligned in a direction perpendicular to the traveling direction Dg of the autonomous travel device 2 (i.e., a direction substantially identical to a width direction Dw of the line 1 during traveling). Specifically, each detecting element 21A is an element that outputs a detection signal when there is the line 1 at an opposed position. In the present embodiment, each detecting element 21A is a Hall element, which detects a magnetic field of the line 1 (magnetic tape) when facing the line 1 and outputs a detection signal (for example, an ON signal).

More specifically, in the line sensor 21, the number and interval of the detecting elements 21A are set so that the width of the line sensor 21 is larger than the normal width W1 of the line 1 and that both edges 1a and 1b of the line 1 in the width direction Dw can be detected. Accordingly, when the autonomous travel device 2 is traveling, a number of the detecting elements 21A corresponding to the width W of the line 1 face the line 1 and output detection signals. That is, the detection signals from these detecting elements 21A are output as a detection result from the line sensor 21.

<Control Unit>

The control unit 23 controls an operation of the autonomous travel device 2 on the basis of a detection result from the line sensor 21. An operation of the autonomous travel device 2 includes a travel operation of traveling along the line 1 and a predetermined operation that is set in advance and is different from the travel operation. Note that a travel operation different from a normal travel operation (for example, a travel operation at a changed speed) may be included in the predetermined operation.

The predetermined operation may be an individual operation, such as stopping, turning right, turning left, or changing speed, or may be a combination of various operations including traveling forward. Turning right is an operation of turning right at a predetermined angle set in advance (for example, 90 or 180 degrees). Turning left is an operation of turning left at a predetermined angle set in advance (for example, 90 or 180 degrees). An example of a predetermined operation as a combination of a plurality of operations is an operation of restarting traveling after turning right. Another example is an operation of restarting traveling after stopping for a predetermined time set in advance (temporary stopping). The predetermined operation to be performed by the autonomous travel device 2 is not limited to an operation related to traveling of the autonomous travel device 2, and various operations may be adopted, such as a cooperative operation with a power feeding device or a conveyor and a cooperative operation with a dolly.

Figure 4:
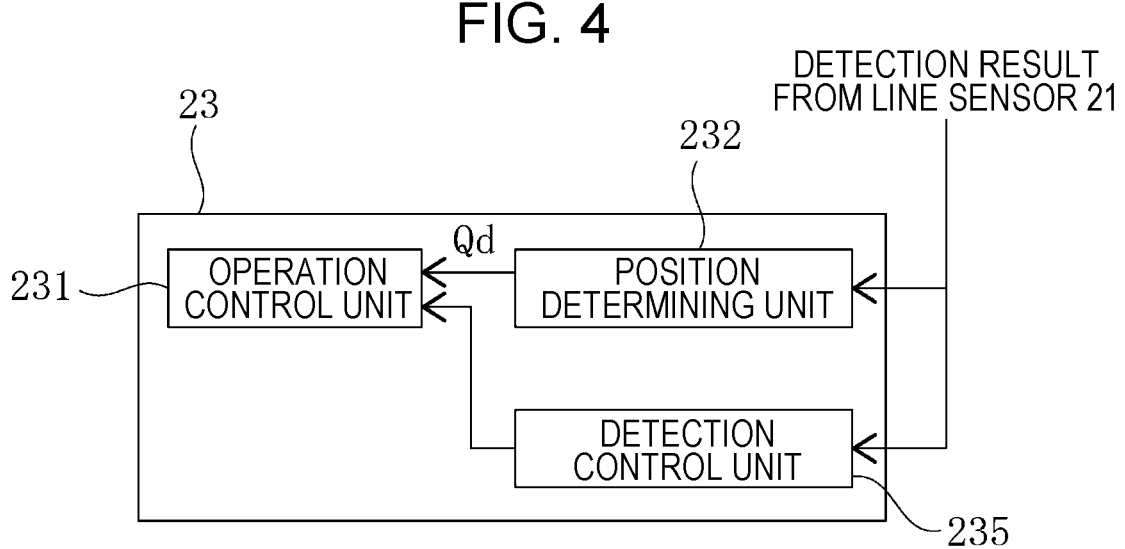
FIG. 4 is a block diagram illustrating the configuration of a control unit included in the autonomous travel device.

FIG. 4 is a block diagram illustrating the configuration of the control unit 23. As illustrated in FIG. 4, the control unit 23 includes an operation control unit 231, a position determining unit 232, and a detection control unit 235. The control unit 23 performs processes in the individual units to perform operation control which will be described below. As the control unit 23, a central processing unit (CPU), a microcomputer, or any other control processing device may be adopted. The control unit 23 may perform the processes on the basis of a corresponding series of computer programs. The computer programs may be stored in a storage medium (for example, a flash memory or the like) in a readable manner or may be stored in the storage unit 24.

Figure 5:
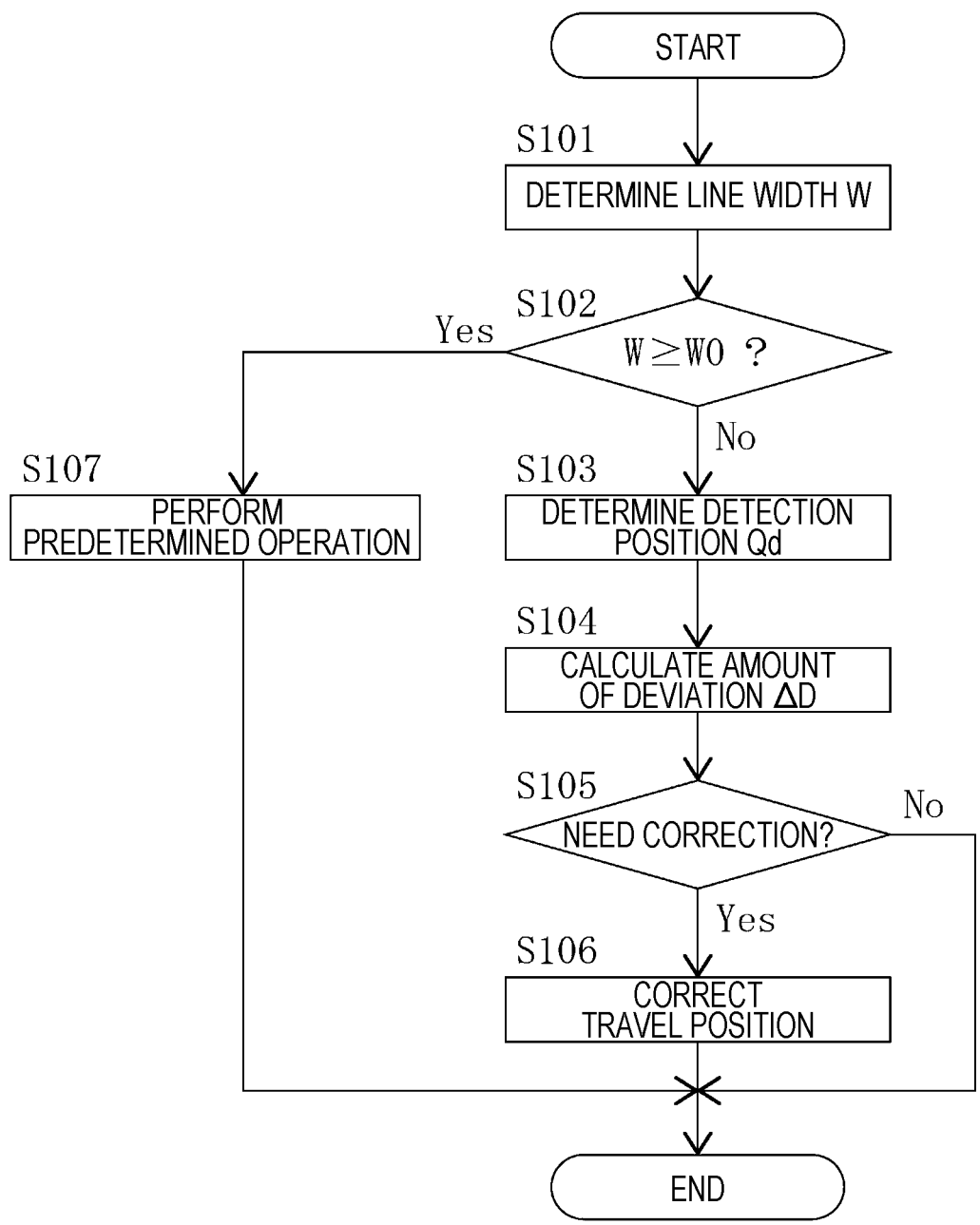
FIG. 5 is a flowchart illustrating a flow of operation control performed by the control unit.

FIG. 5 is a flowchart illustrating a flow of operation control performed by the control unit 23. The operation control illustrated in FIG. 5 is repeatedly performed while the autonomous travel device 2 is continuing a normal travel operation. In the normal travel operation, the control unit 23 controls the travel position of the autonomous travel device 2 in the width direction Dw of the line 1 while causing the autonomous travel device 2 to travel along the line 1. More specifically, the control unit 23 performs the following control.

First, the operation control unit 231 controls the rotation of each of the left motor 203A and the right motor 203B to cause the autonomous travel device 2 to travel. While the autonomous travel device 2 is traveling, the detection control unit 235 determines the width W of the line 1 on the basis of a detection result from the line sensor 21 (detection signals from the detecting elements 21A) (step S101). Specifically, the detection control unit 235 determines the width W of the line 1 on the basis of the number of the detecting elements 21A that have output detection signals (see FIG. 3).

Subsequently, the detection control unit 235 determines whether or not the determined width W of the line 1 is larger than or equal to a predetermined reference width W0 (Yes or No) (step S102). Here, the predetermined reference width W0 is set to a value that is smaller than or equal to the width W2 at the widened portion 11 of the line 1 and is larger than the normal width W1 of the line 1. Accordingly, if the determination by the detection control unit 235 in step S102 is Yes (the width W is larger than or equal to the predetermined reference width W0), the widened portion 11 is detected.

From the viewpoint of increasing the accuracy of detection by the detection control unit 235, it is preferable that the width W2 at the widened portion 11 of the line 1 be larger than the width of the line sensor 21. In this case, the predetermined reference width W0 can be set to an upper limit value of a line width detectable by the line sensor 21 (i.e., corresponding to the width of the line sensor 21), and the two widths W1 and W2 of the line 1 can be easily distinguished from each other.

If the determination by the detection control unit 235 in step S102 is No (the width W is smaller than the predetermined reference width W0), the position determining unit 232 determines a detection position Qd of the line 1 in the line sensor 21 on the basis of a detection result from the line sensor 21 (detection signals from the detecting elements 21A) (step S103). Specifically, the position determining unit 232 determines the detection position Qd on the basis of the positions of the detecting elements 21A that have output detection signals in the line sensor 21.

In one example, the detection position Qd corresponds to a center line 1c of the line 1 (see FIG. 3). In this case, the detection position Qd is determined from the positions of two detecting elements 21A at both ends among the detecting elements 21A that have output detection signals. For example, a midpoint between the positions is determined to be the detection position Qd. In another example, the detection position Qd may correspond to the edge 1a or 1b of the line 1 (see FIG. 3). In this case, the detection position Qd is determined from the position of the detecting element 21A at the left end or right end among the detecting elements 21A that have output detection signals.

Subsequently, the operation control unit 231 controls the travel position of the autonomous travel device 2 in the width direction Dw of the line 1 on the basis of the detection position Qd determined by the position determining unit 232, while causing the autonomous travel device 2 to travel along the line 1. Specifically, the operation control unit 231 calculates an amount of deviation ΔD (see FIG. 3) of the detection position Qd from a predetermined position Q0 in the line sensor 21 (step S104). After that, the operation control unit 231 determines, on the basis of the amount of deviation ΔD, whether or not the travel position needs to be corrected (Yes or No) (step S105). Specifically, the operation control unit 231 determines whether or not the absolute value of the amount of deviation ΔD is larger than a predetermined value d0, which is an upper limit value of tolerance.

If the determination by the operation control unit 231 in step S105 is Yes (the travel position needs to be corrected), the operation control unit 231 controls the rotation of each of the left motor 203A and the right motor 203B to move the autonomous travel device 2 to the right or to the left so that the absolute value of the amount of deviation ΔD becomes smaller than or equal to the predetermined value d0 (step S106). On the other hand, if the determination by the operation control unit 231 in step S105 is No (the travel position does not need to be corrected), the operation control unit 231 keeps the rotation of each the left motor 203A and the right motor 203B in the state at the time without changing the state.

On the other hand, if the determination by the detection control unit 235 in step S102 is Yes (the width W is larger than or equal to the predetermined reference width W0), the operation control unit 231 causes the autonomous travel device 2 to perform a predetermined operation (for example, stopping) set in advance to be performed by the autonomous travel device 2 at this time (step S107). Any of the above-described various operations may be adopted as the predetermined operation to be performed by the autonomous travel device 2 in step S107.

In the autonomous travel system according to the first embodiment, the widened portion 11 with an increased width W can be partially formed in the line 1 by a simple task of attaching another magnetic tape to the magnetic tape attached along the travel route such that the magnetic tapes cross each other. In addition, the widened portion 11 can be accurately detected through simple control of determining the width W of the line 1. Thus, providing the widened portion 11 at a position desired by a user makes it possible to cause the autonomous travel device 2 to perform a predetermined operation at an exact desired position. In this autonomous travel system, control to cause the autonomous travel device 2 to perform a predetermined operation at a predetermined position on a travel route can be easily realized.

In addition, in the autonomous travel system according to the first embodiment, the width W of the line 1 can be detected by the line sensor 21 that is conventionally used to control a travel position. Accordingly, the configuration of the autonomous travel device 2 is not complicated.

[2] Second Embodiment

Figure 6:
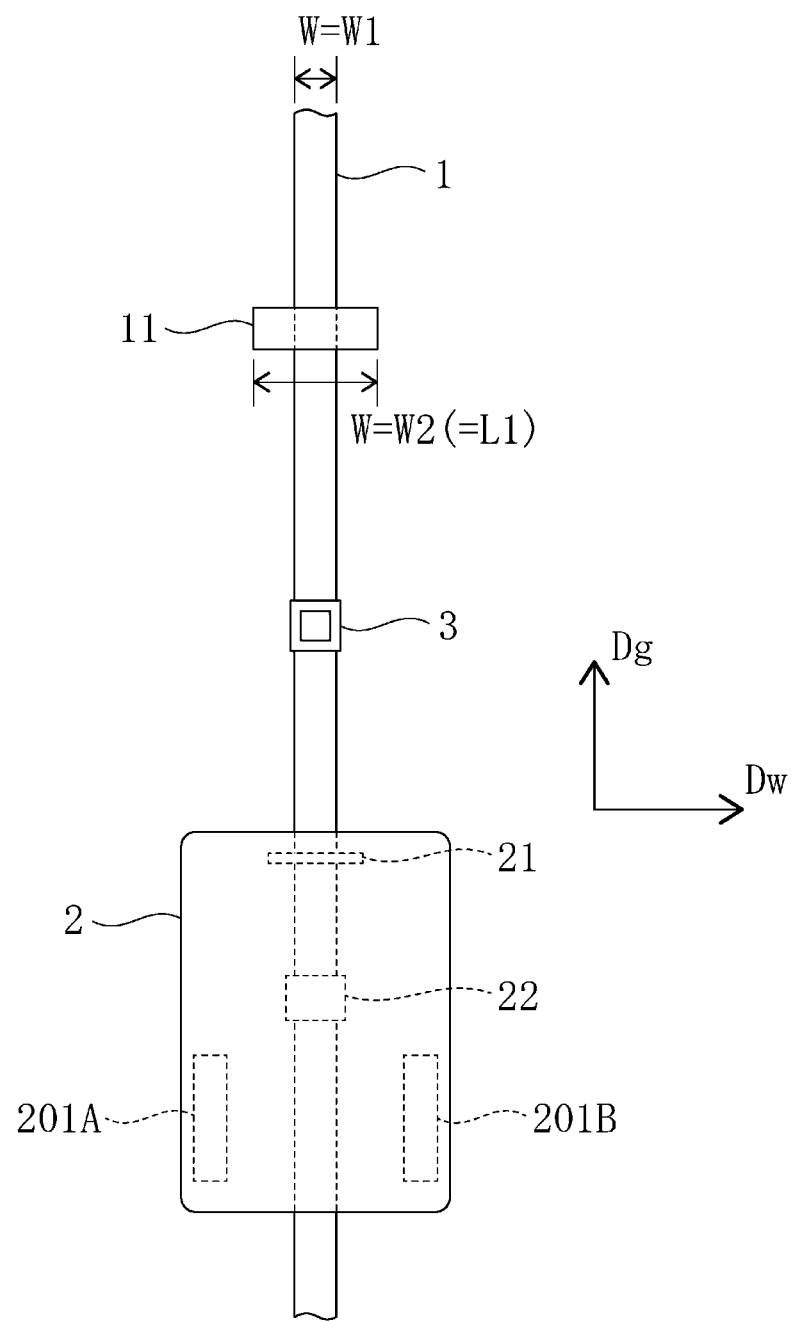
FIG. 6 is a conceptual diagram illustrating an autonomous travel system according to a second embodiment.

FIG. 6 is a conceptual diagram illustrating an autonomous travel system according to a second embodiment. As illustrated in FIG. 6, the autonomous travel system according to the second embodiment further includes a marker 3 that is used by being placed on the travel route. In the present embodiment, the marker 3 is superimposed on the line 1. As the marker 3, a radio frequency identifier (RFID) which is a communication tag is used. Alternatively, the marker 3 may be placed at a position away from the line 1 by a predetermined distance. The marker 3 is not limited to the RFID and various types of communication tags may be used.

The autonomous travel device 2 further includes a detection sensor 22 that detects the marker 3 placed on the travel route. In the present embodiment, the detection sensor 22 is placed at a position so as to be able to face the marker 3 when the autonomous travel device 2 is traveling. As the detection sensor 22, an RFID sensor capable of communicating with the RFID used as the marker 3 is used. The detection sensor 22 may be placed at a position deviated from the position facing the marker 3 as long as the detection sensor 22 is capable of communicating with the marker 3. The detection sensor 22 can be appropriately changed in accordance with the type of the communication tag used as the marker 3.

The marker 3 has, recorded thereon in a readable manner, operation control information related to a predetermined operation of the autonomous travel device 2. The detection sensor 22 detects the marker 3 placed on the travel route to obtain the operation control information recorded on the marker 3. Specifically, the detection sensor 22 communicates with the marker 3 while the autonomous travel device 2 is traveling, thereby obtaining the operation control information recorded on the marker 3.

Use of a communication tag such as an RFID as the marker 3 enables the detection sensor 22 and the marker 3 to communicate with each other for a predetermined period over which the autonomous travel device 2 passes over the marker 3 and its vicinity (a period longer than a period over which the detection sensor 22 faces the marker 3). Thus, the operation control information recorded on the marker 3 can be accurately obtained even while the autonomous travel device 2 is traveling. Furthermore, even if the operation control information is complicated to some extent, the information can be easily read through communication.

Furthermore, in the present embodiment, predetermined operations of the autonomous travel device 2 are set in advance as operation patterns, and the operation patterns and pieces of operation control information are stored in the storage unit 24 in association with each other. As the storage unit 24, a flash memory, a hard disk drive (HDD), or the like is used, for example.

As will be described below, an operation pattern associated with the operation control information obtained by the detection sensor 22 is read from the storage unit 24 during operation control (see step S304 in FIG. 9). Thus, it is not necessary to store an operation program for the entire travel route (a complicated operation program describing the positions and timings at which various operations are to be performed on the travel route, the order in which the various operations are to be performed, and so forth) in the autonomous travel device 2, and it is sufficient to store therein simple information including operation patterns and pieces of operation control information associated with each other. The operation control information recorded on the marker 3 need not necessarily be complicated information, and may be information with a small amount of data, such as an identifiable number or symbol.

The control unit 23 controls the operation of the autonomous travel device 2 on the basis of the detection result from the line sensor 21 and the operation control information obtained by the detection sensor 22. Specifically, the control unit 23 enters a preparatory state in response to detection of the marker 3. If the width W of the line 1 determined when the control unit 23 is in the preparatory state is larger than or equal to the predetermined reference width W0, the control unit 23 causes the autonomous travel device 2 to perform a predetermined operation that is based on the operation control information obtained from the marker 3. Hereinafter, the state of the control unit 23 before shifting to the preparatory state is defined as a normal state.

Figure 7:
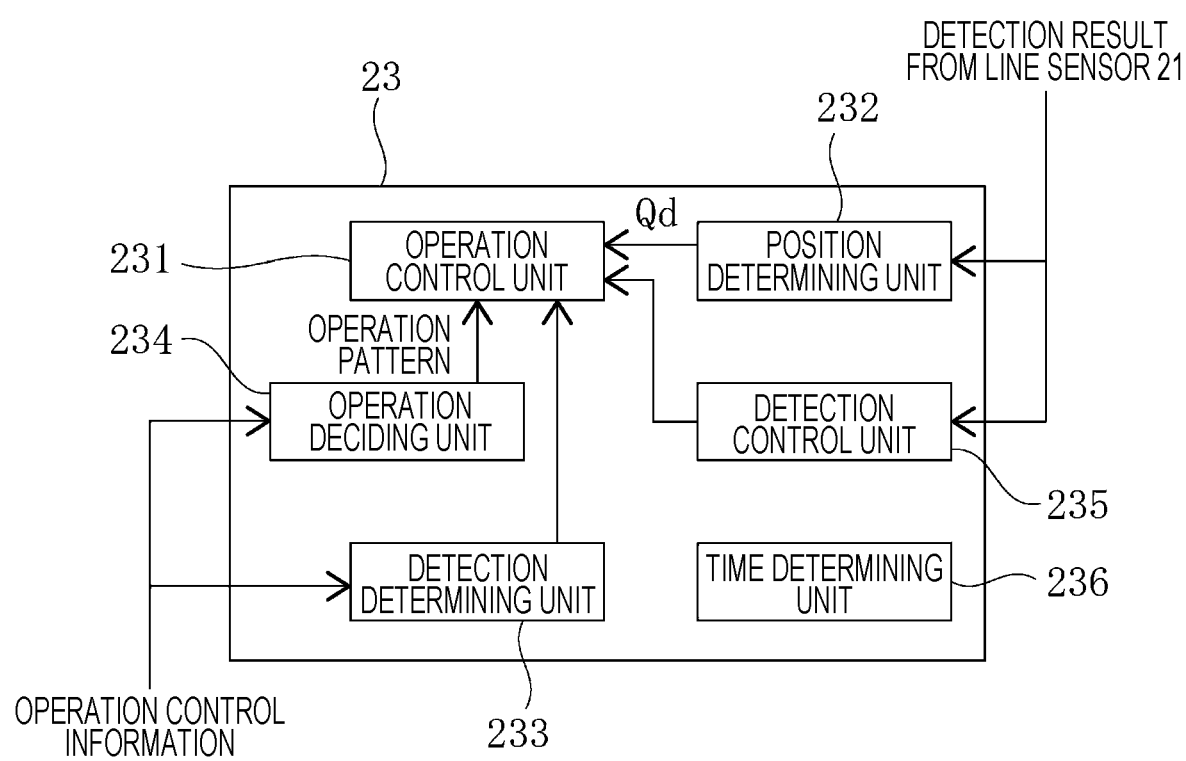
FIG. 7 is a block diagram illustrating the configuration of a control unit according to the second embodiment.

FIG. 7 is a block diagram illustrating the configuration of the control unit 23 according to the second embodiment. As illustrated in FIG. 7, the control unit 23 includes the operation control unit 231, the position determining unit 232, a detection determining unit 233, an operation deciding unit 234, the detection control unit 235, and a time determining unit 236. The control unit 23 performs processes in the individual units to perform state control and operation control which will be described below.

Figure 8:
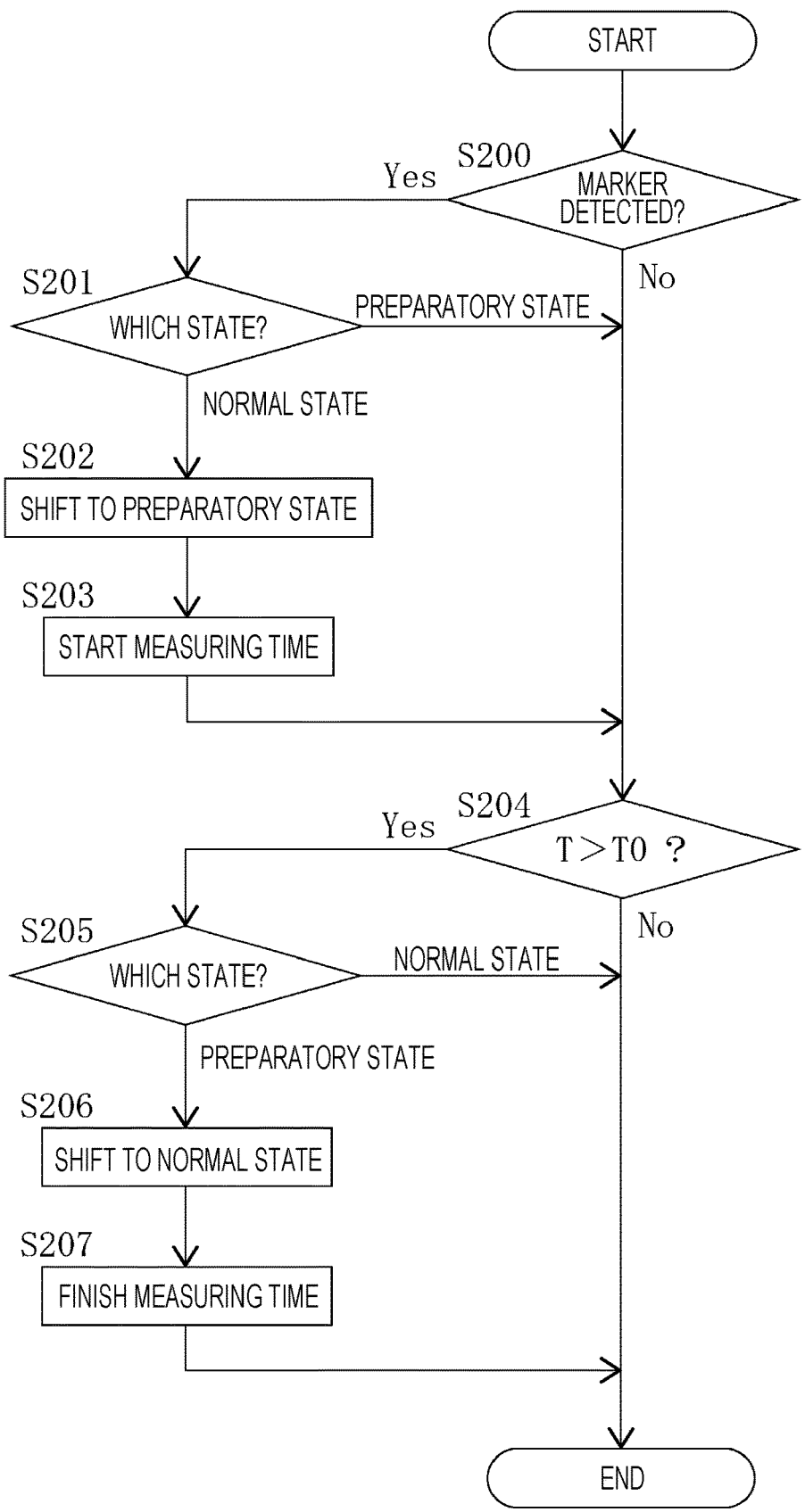
FIG. 8 is a flowchart illustrating a flow of state control performed by the control unit in the second embodiment.
Figure 9:
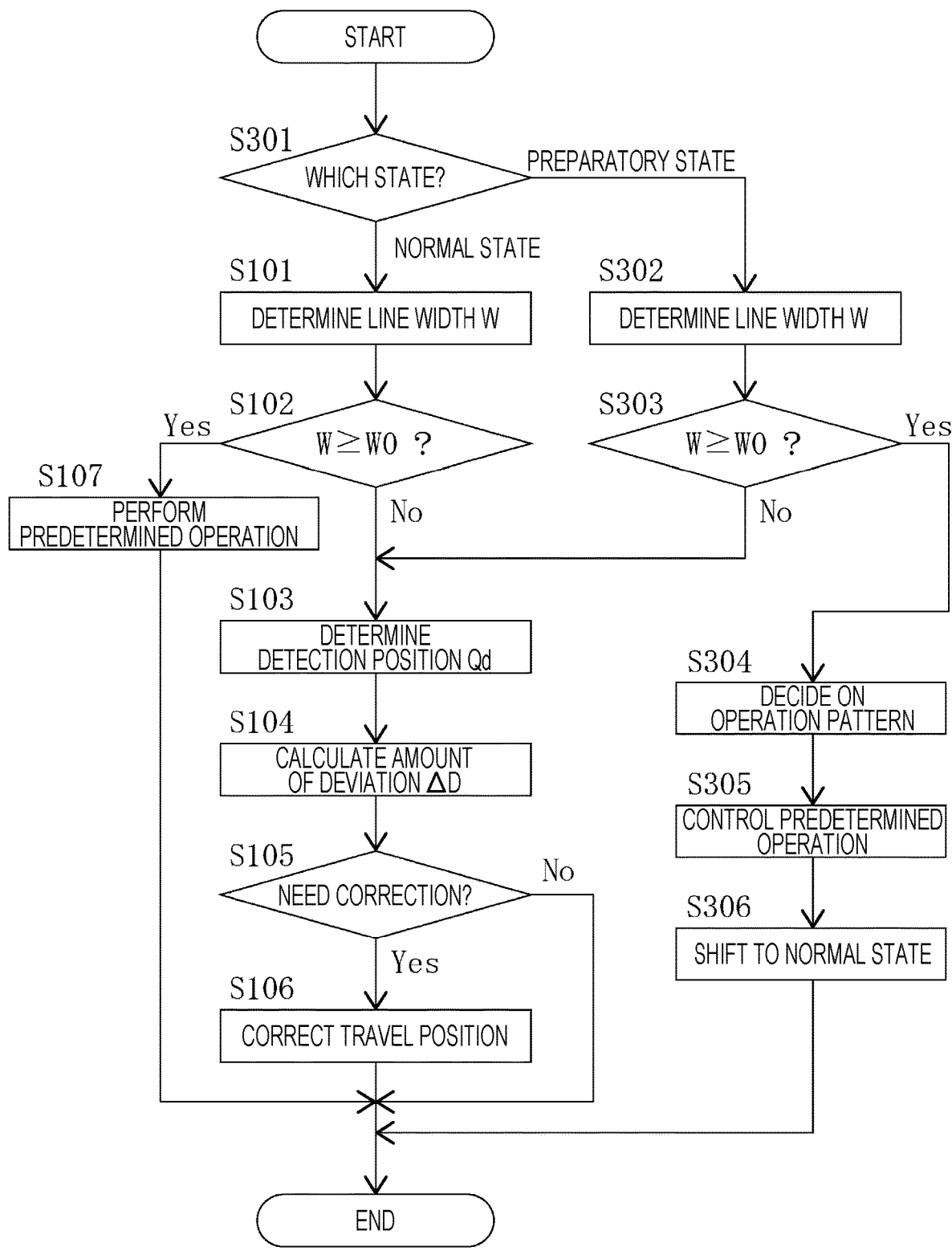
FIG. 9 is a flowchart illustrating a flow of operation control performed by the control unit in the second embodiment.

FIG. 8 is a flowchart illustrating a flow of the state control performed by the control unit 23, and FIG. 9 is a flowchart illustrating a flow of the operation control performed by the control unit 23. The state control and the operation control illustrated in FIG. 8 and FIG. 9, respectively, are repeatedly performed during a period over which the autonomous travel device 2 is continuing a normal travel operation.

(1) State Control

In state control (see FIG. 8), first, the detection determining unit 233 determines whether or not the detection sensor 22 has detected the marker 3 (Yes or No) (step S200). When the detection sensor 22 detects the marker 3 and obtains operation control information while the autonomous travel device 2 is traveling, the detection determining unit 233 makes a determination "Yes" (determines that the detection sensor 22 has detected the marker 3) in step S200. In this case, the control unit 23 determines whether the state of the control unit 23 at the time is the normal state or the preparatory state (step S201).

If the control unit 23 determines in step S201 that the state of the control unit 23 is the normal state, the control unit 23 shifts from the normal state to the preparatory state (step S202). At this time, the control unit 23 causes the time determining unit 236 to start measuring time (step S203). In step S204, the time determining unit 236 determines whether or not a measured time T exceeds a predetermined time T0.

If the determination by the detection determining unit 233 in step S200 is No (the detection sensor 22 has not detected the marker 3), the control unit 23 causes the time determining unit 236 to determine whether or not the measured time T exceeds the predetermined time T0 regardless of the state (normal state or preparatory state) of the control unit 23 (step 204). If the control unit 23 determines in step S201 that the state of the control unit 23 is the preparatory state, the control unit 23 causes, while remaining in the preparatory state, the time determining unit 236 to determine whether or not the measured time T exceeds the predetermined time T0 (step 204).

If the determination by the time determining unit 236 in step S204 is Yes (the measured time T exceeds the predetermined time T0), the control unit 23 determines whether the state of the control unit 23 at the time is the normal state or the preparatory state (step S205).

If the control unit 23 determines in step S205 that the state of the control unit 23 is the preparatory state, the control unit 23 shifts from the preparatory state to the normal state (step S206). At this time, the control unit 23 causes the time determining unit 236 to finish measuring time and to reset the measured time T (step S207). Accordingly, the flow of the state control once ends.

If the determination by the time determining unit 236 in step S204 is No (the measured time T is within the predetermined time T0), the control unit 23 once ends the flow of the state control regardless of the state (normal state or preparatory state) of the control unit 23. If the control unit 23 determines in step S205 that the state of the control unit 23 is the normal state, the control unit 23 once ends the flow of the state control while remaining in the normal state.

(2) Operation Control

In operation control according to the second embodiment (see FIG. 9), first, the control unit 23 determines whether the state of the control unit 23 is the normal state or the preparatory state (step S301). If the control unit 23 determines in step S300 that the state of the control unit 23 is the normal state, the control unit 23 performs steps S101 to S107 described in the first embodiment.

On the other hand, if the control unit 23 determines in step 301 that the state of the control unit 23 is the preparatory state, the control unit 23 causes the detection control unit 235 to determine the width W of the line 1 (step S302) and to determine whether the determined width W of the line 1 is larger than or equal to the predetermined reference width W0 (Yes or No) (step S303) while remaining in the preparatory state. Steps S302 and S303 are the same as steps S101 and S102 described in the first embodiment.

If the determination by the detection control unit 235 in step S303 is Yes (the width W is larger than or equal to the predetermined reference width W0), the operation control unit 231 causes the autonomous travel device 2 to perform a predetermined operation (steps S304 and S305). That is, the control unit 23 causes the autonomous travel device 2 to perform the predetermined operation if the width W of the line 1 determined when the control unit 23 is in the preparatory state is larger than or equal to the predetermined reference width W0.

Specifically, the operation deciding unit 234 decides on an operation pattern to be performed by the autonomous travel device 2 on the basis of the operation control information obtained by the detection sensor 22 from the marker 3 when the determination by the detection determining unit 233 in step S200 is Yes (step S304). More specifically, the operation deciding unit 234 reads from the storage unit 24 an operation pattern corresponding to the operation control information obtained by the detection sensor 22. Subsequently, the operation control unit 231 controls the operation of the autonomous travel device 2 on the basis of the operation pattern decided on by the operation deciding unit 234 (step S305). After that, the control unit 23 shifts from the preparatory state to the normal state (S306). That is, even before the measured time T exceeds the predetermined time T0 (before the determination "Yes" is made in step S204 in the state control (FIG. 8)), the control unit 23 shifts to the normal state after causing the autonomous travel device 2 to perform a predetermined operation in the operation control.

If the determination by the detection control unit 235 in step S303 is No (the width W is smaller than the predetermined reference width W0), the control unit 23 causes the autonomous travel device 2 to perform a travel operation while remaining in the preparatory state (steps S103 to S106).

In the autonomous travel system according to the second embodiment, it is possible to cause the autonomous travel device 2 to perform, at a position desired by a user, various predetermined operations on the basis of the operation control information obtained from the marker 3 corresponding to the position. Accordingly, with a simple task of placing the widened portion 11 and the marker 3 on the line 1, the travel route of the autonomous travel device 2 within the line 1 can be easily set. Even when it becomes necessary to change the travel route, the travel route can be easily changed by adding or changing the marker 3 or the widened portion 11. Furthermore, even when the line 1 is partially changed through addition or re-attaching of a magnetic tape, the setting or changing of the travel route according to the change can be easily performed by adding or changing the marker 3 or the widened portion 11.

[3] Third Embodiment

Figure 10:
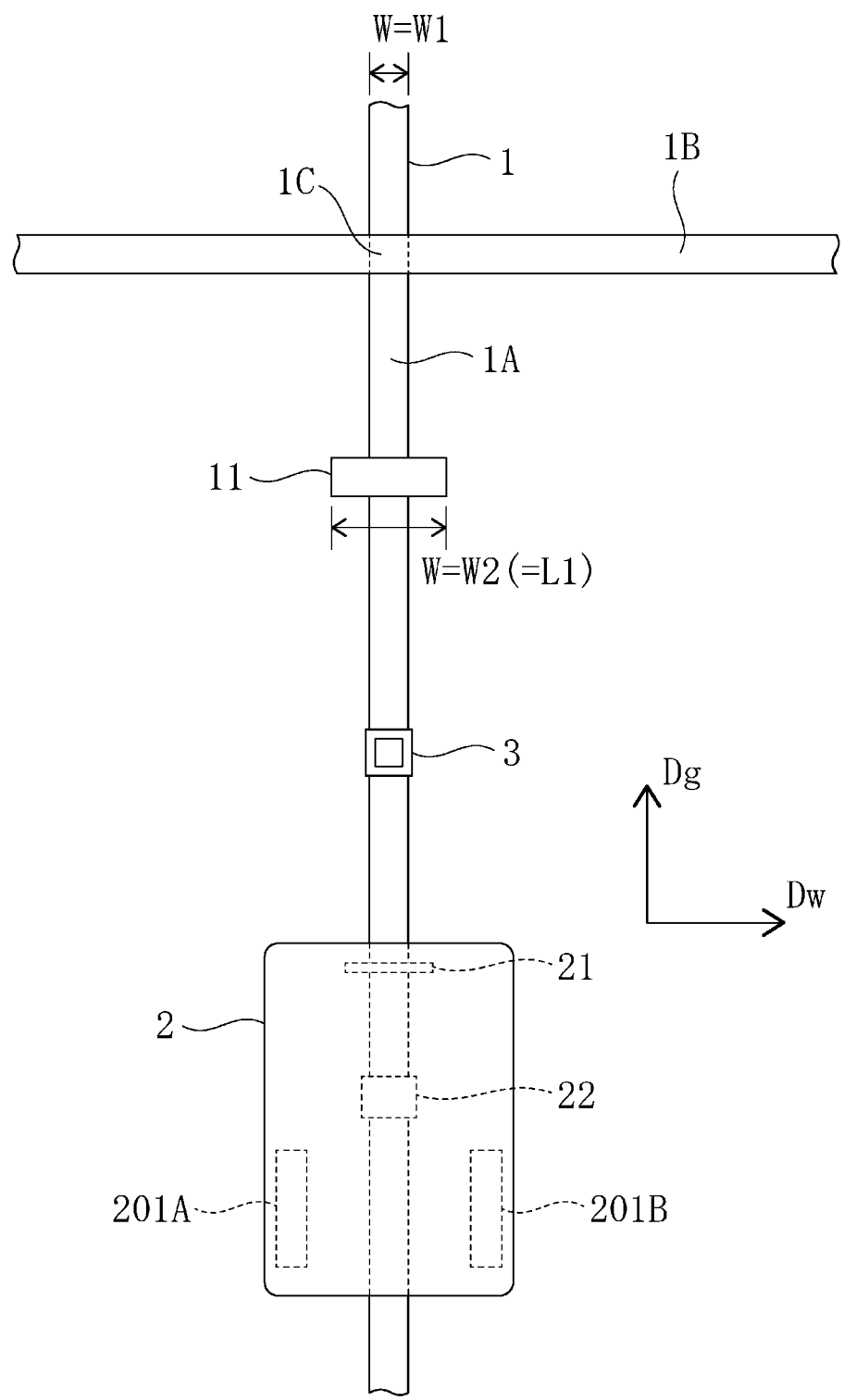
FIG. 10 is a conceptual diagram illustrating an autonomous travel system according to a third embodiment.

FIG. 10 is a conceptual diagram illustrating an autonomous travel system according to a third embodiment. As illustrated in FIG. 10, the autonomous travel system according to the third embodiment includes the marker 3 as in the second embodiment. In the present embodiment, the marker 3 may have, recorded thereon in a readable manner, operation control information as in the second embodiment, or may not have operation control information. Anyway, it is important in the present embodiment that the detection sensor 22 detects the marker 3. Hereinafter, a description will be given of a case where the marker 3 does not have operation control information. The configurations of the marker 3 and the detection sensor 22 are similar to those in the second embodiment, and thus the description thereof is omitted here.

In the present embodiment, the control unit 23 controls the operation of the autonomous travel device 2 on the basis of a detection result from the line sensor 21 and a detection result from the detection sensor 22. Specifically, the control unit 23 enters the preparatory state in response to detection of the marker 3, and causes the autonomous travel device 2 to perform a predetermined operation if the width W of the line 1 determined in the preparatory state is larger than or equal to the predetermined reference width W0. On the other hand, if the state of the control unit 23 is not the preparatory state (i.e., the normal state), the control unit 23 does not cause the autonomous travel device 2 to perform a predetermined operation even if the determined width W of the line 1 is larger than or equal to the predetermined reference width W0.

Figure 11:
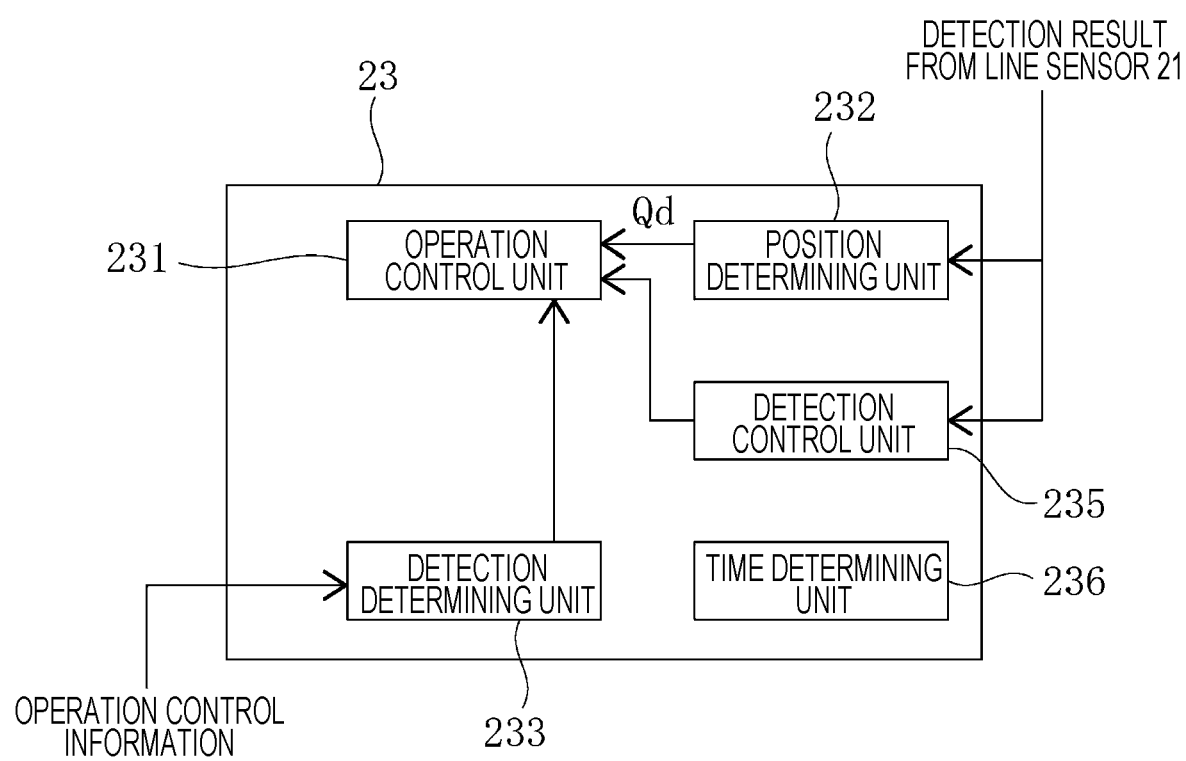
FIG. 11 is a block diagram illustrating the configuration of a control unit according to the third embodiment.

FIG. 11 is a block diagram illustrating the configuration of the control unit 23 according to the third embodiment. As illustrated in FIG. 11, the control unit 23 includes the operation control unit 231, the position determining unit 232, the detection determining unit 233, the detection control unit 235, and the time determining unit 236. The control unit 23 performs processes in the individual units to perform state control and operation control which will be described below. The state control is the same as that described in the second embodiment (see FIG. 8), and thus the description thereof is omitted here.

Figure 12:
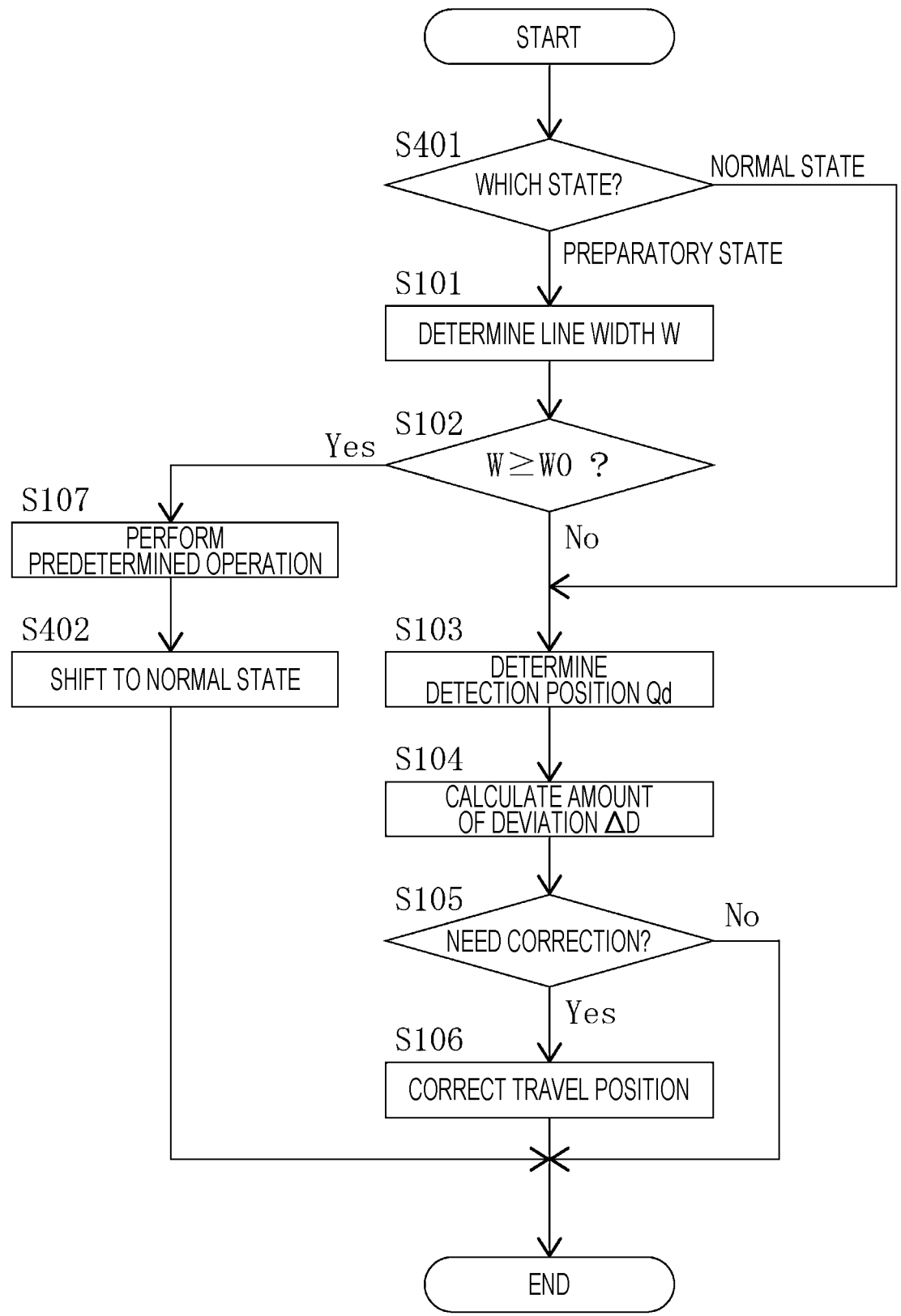
FIG. 12 is a flowchart illustrating a flow of operation control performed by the control unit in the third embodiment.

FIG. 12 is a flowchart illustrating a flow of the operation control performed by the control unit 23 in the third embodiment. First, the control unit 23 determines whether the state of the control unit 23 is the normal state or the preparatory state (step S401). If the control unit 23 determines in step S401 that the state of the control unit 23 is the preparatory state, the control unit 23 performs steps S101 to S107 described in the first embodiment. That is, the control unit 23 causes the autonomous travel device 2 to perform a predetermined operation if the width W of the line 1 determined when the control unit 23 is in the preparatory state is larger than or equal to the predetermined reference width W0. After causing the autonomous travel device 2 to perform the predetermined operation, the control unit 23 shifts from the preparatory state to the normal state (step S402).

On the other hand, if the control unit 23 determines in step S401 that the state of the control unit 23 is the preparatory state, the control unit 23 performs steps S103 to S106 described in the first embodiment. That is, when the control unit 23 is not in the preparatory state, the control unit 23 does not cause the autonomous travel device 2 to perform a predetermined operation even if the determined width W of the line 1 is larger than or equal to the predetermined reference width W0.

As illustrated in FIG. 10, when the line 1 includes two magnetic tapes 1A and 1B that extend in different directions and cross each other, there is an intersection point 1C at which the two magnetic tapes 1A and 1B cross each other, such as an intersection or a turn, in the line 1. The intersection point 1C is a portion that may be wrongly detected as the widened portion 11 by the control unit 23.

Thus, in the autonomous travel system according to the third embodiment, the marker 3 is placed at a position before the widened portion 11 (a position away from the widened portion 11 by a predetermined distance) in the traveling direction Dg of the autonomous travel device 2, and accordingly it becomes possible to accurately detect the widened portion 11 by distinguishing it from a portion that may be wrongly detected. As a result, a wrong operation is prevented from occurring where the autonomous travel device 2 performs a predetermined operation at a position (the intersection point 1C, such as an intersection or a turn) other than a position desired by a user. The foregoing predetermined distance is set so that the widened portion 11 can be detected within the predetermined time T0 after the marker is detected, in accordance with the speed of the autonomous travel device 2 during a normal travel operation and the predetermined time T0 used in step S204 (see FIG. 8).

In the present embodiment, a description has been given of a case where the marker 3 does not have operation control information, but the present invention is not limited thereto. As in the second embodiment, operation control information may be recorded on the marker 3 in a readable manner.

Accordingly, it becomes possible to cause the autonomous travel device 2 to perform a desired operation at the widened portion 11 while distinguishing the widened portion 11 from a portion that may be wrongly detected.

[4] Fourth Embodiment

In the autonomous travel system according to the third embodiment, the control unit 23 causes the autonomous travel device 2 to perform a predetermined operation if the width W of the line 1 determined when the control unit 23 is in the preparatory state is larger than or equal to the predetermined reference width W0, and does not cause the autonomous travel device 2 to perform a predetermined operation when the control unit 23 is not in the preparatory state even if the determined width W of the line 1 is larger than or equal to the predetermined reference width W0. In the fourth embodiment, the control unit 23 may perform control opposite to the control according to the third embodiment. Specifically, the control unit 23 performs the following control.

Figure 13:
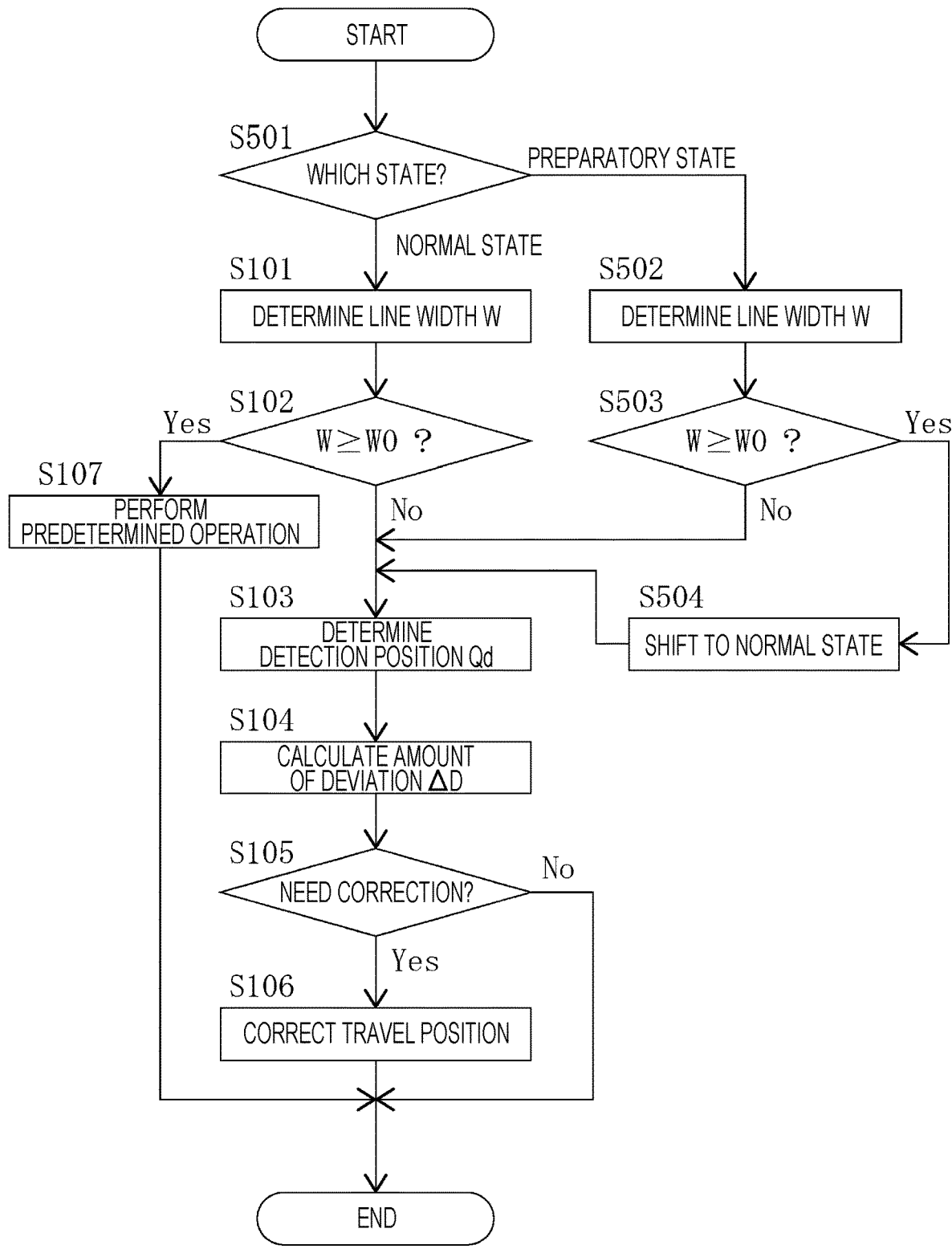
FIG. 13 is a flowchart illustrating a flow of operation control performed by the control unit in a fourth embodiment.

FIG. 13 is a flowchart illustrating a flow of the operation control performed by the control unit 23 in the fourth embodiment. As in the third embodiment, the control unit 23 first determines whether the state of the control unit 23 is the normal state or the preparatory state (step S501). If the control unit 23 determines in step S501 that the state of the control unit 23 is the normal state, the control unit 23 performs steps S101 to S107 described in the first embodiment. That is, the control unit 23 causes the autonomous travel device 2 to perform a predetermined operation if the width W of the line 1 determined when the control unit 23 is not in the preparatory state is larger than or equal to the predetermined reference width W0.

On the other hand, if the control unit 23 determines in step S501 that the state of the control unit 23 is the preparatory state, the control unit 23 causes the detection control unit 235 to determine the width W of the line 1 (step S502) and to determine whether or not the determined width W of the line 1 is larger than or equal to the predetermined reference width W0 (Yes or No) (step S503) while remaining in the preparatory state. Steps S502 and S503 are the same as steps S101 and S102 described in the first embodiment.

If the determination by the detection control unit 235 in step S503 is Yes (the width W is larger than or equal to the predetermined reference width W0), the control unit 23 shifts from the preparatory state to the normal state in step S504 and then performs steps S103 to S106 described in the first embodiment. If the determination by the detection control unit 235 in step S503 is No (the width W is smaller than the predetermined reference width W0), the control unit 23 performs steps S103 to S106 while remaining in the preparatory state. That is, in the preparatory state, the control unit 23 does not cause the autonomous travel device 2 to perform a predetermined operation even if the determined width W of the line 1 is larger than or equal to the predetermined reference width W0.

Figure 14:
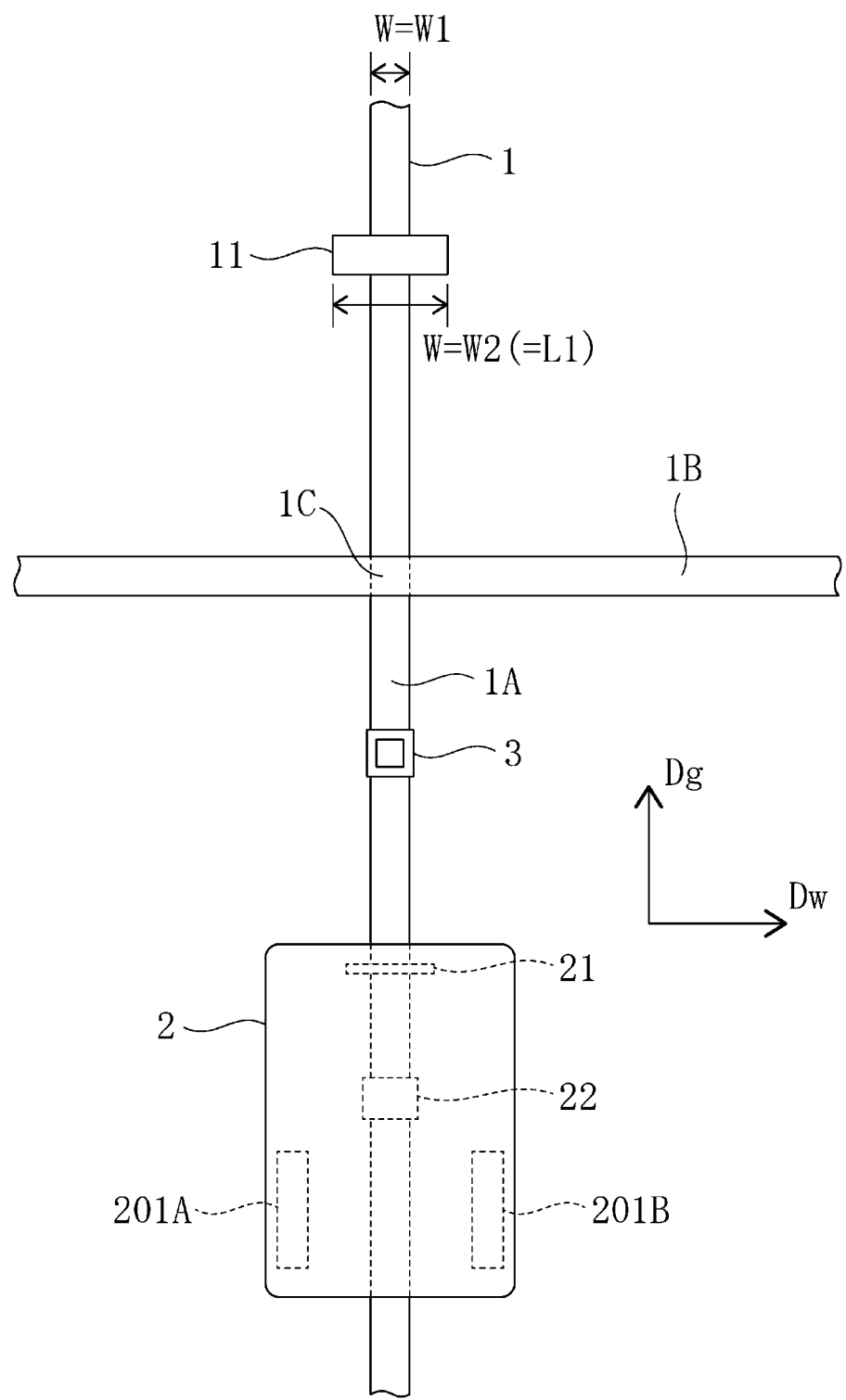
FIG. 14 is a conceptual diagram illustrating an example of an autonomous travel system according to the fourth embodiment.

FIG. 14 is a conceptual diagram illustrating an example of the autonomous travel system according to the fourth embodiment. As described in the third embodiment, when the line 1 includes the two magnetic tapes 1A and 1B that extend in different directions and cross each other, there is the intersection point 1C at which the two magnetic tapes 1A and 1B cross each other, such as an intersection or a turn, in the line 1. The intersection point 1C is a portion that may be wrongly detected as the widened portion 11 by the control unit 23.

Thus, in the autonomous travel system according to the fourth embodiment, the marker 3 is placed at a position before the foregoing portion (a position away from the portion by a predetermined distance) in the traveling direction Dg of the autonomous travel device 2, and accordingly a wrong operation is prevented from occurring where the autonomous travel device 2 performs a predetermined operation at a portion such as an intersection or a turn (intersection point C1). Accordingly, it becomes possible to accurately detect the widened portion 11 by distinguishing it from a portion such as an intersection or a turn. As a result, it becomes possible to cause the autonomous travel device 2 to perform a predetermined operation at an exact position desired by a user. The foregoing predetermined distance is set so that the portion can be detected within the predetermined time T0 after the marker is detected, in accordance with the speed of the autonomous travel device 2 during a normal travel operation and the predetermined time T0 used in step S204 (see FIG. 8).

[5] Other Embodiments

In the above-described autonomous travel system, the line 1 is not limited to a magnetic tape, and various lines that can be detected by a sensor or the like, such as a reflective tape, may be used. The marker 3 is not limited to a communication tag, and a two-dimensional printed manner, such as a bar code or a QR code (registered trademark), may be used.

The description of the above embodiments is to be considered in all aspects as illustrative and non-restrictive. The scope of the present invention is indicated by the claims, not by the above embodiments. Furthermore, the scope of the present invention is intended to include all changes within the meaning and scope equivalent to the claims.

REFERENCE SIGNS LIST 1 line
1a edge
1c center line
1A, 1B magnetic tape
1C intersection point
2 autonomous travel device
2a bottom surface
3 marker
11 widened portion
20 driving mechanism
21 line sensor
21A detecting element
22 detection sensor
23 control unit
24 storage unit
25 rechargeable battery
201A left driving wheel
201B right driving wheel
202 auxiliary wheel
203A left motor
203B right motor
231 operation control unit
232 position determining unit
233 detection determining unit
234 operation deciding unit
235 detection control unit
236 time determining unit
C1 intersection point
Dg traveling direction
Dw width direction L1 length
Q0 predetermined position
Qd detection position
T measured time
T0 predetermined time
W, W1, W2 width
W0 reference width
d0 predetermined value

The invention claimed is:

1. An automated ground vehicle that travels along a line placed on a travel route, the vehicle comprising:
    detector circuitry that detect the line;
    control circuitry that control an operation of the automated ground vehicle on the basis of a detection result from the detector circuitry, wherein
    the control circuitry
    determine a width of the line on the basis of the detection result from the detector circuitry,
    cause, if the determined width of the line is smaller than a predetermined reference width, the automated ground vehicle to perform a travel operation of traveling along the line, and
    cause, if the determined width of the line is larger than or equal to the predetermined reference width, the automated ground vehicle to perform a predetermined operation different from the travel operation,
    wherein the predetermined operation comprises at least one of stopping, turning right, turning left, and changing speed or a combination of the operations with another device;
    detection sensor circuitry that detect a marker placed on the travel route, wherein
        the control circuitry enter a preparatory state in response to detection of the marker by the detection sensor circuitry,
        cause the automated ground vehicle to perform the predetermined operation if the width of the line determined when the control circuitry are in the preparatory state is larger than or equal to the predetermined reference width, and
        do not cause the automated ground vehicle to perform the predetermined operation when the control circuitry are not in the preparatory state even if the determined width of the line is larger than or equal to the predetermined reference width.

2. The automated ground vehicle according to claim 1, wherein
    the detector circuitry include a line sensor provided on a bottom surface of the automated ground vehicle, and
    the control circuitry determine the width of the line on the basis of a detection result from the line sensor.

3. The automated ground vehicle according to claim 2, wherein
    the control circuitry
    are capable of further determining a detection position of the line in the line sensor in addition to determining the width of the line on the basis of the detection result from the line sensor, and
    further determine the detection position if the determined width of the line is smaller than the predetermined reference width, and control a travel position of the automated ground vehicle in a width direction of the line on the basis of the determined detection position while causing the automated ground vehicle to travel along the line.

4. The automated ground vehicle according to claim 1, wherein the predetermined reference width is an upper limit value of a line width detectable by the detector circuitry.

5. The automated ground vehicle according to claim 1, further comprising:
    detection sensor circuitry that detects a marker placed on the travel route, wherein
    the control circuitry
    enter a preparatory state in response to detection of the marker by the detection sensor circuitry,
    cause the automated ground vehicle to perform the predetermined operation if the width of the line determined when the control circuitry are not in the preparatory state is larger than or equal to the predetermined reference width, and
    do not cause the automated ground vehicle to perform the predetermined operation when the control circuitry are in the preparatory state even if the determined width of the line is larger than or equal to the predetermined reference width.

6. The automated ground vehicle according to claim 1, wherein the detection sensor circuitry detect a communication tag placed on the travel route as the marker.

7. The automated ground vehicle according to claim 1, further comprising:
    an automated traveling system wherein a line serving as a guide for traveling is placed on a travel route along which the automated ground vehicle travels, the line partially having a widened portion with an increased width.

8. The automated ground vehicle according to claim 7, wherein the line is formed of a first magnetic tape attached on the travel route, and the widened portion is a second magnetic tape attached so as to cross the first magnetic tape.

* * * * *